Jan. 18, 1949.　　　L. D. CAHILL ET AL　　　2,459,496
INSTRUMENT CAGING MECHANISM

Filed Dec. 5, 1945　　　2 Sheets-Sheet 1

INVENTORS
LYSLE D. CAHILL
WALTER T. BUHL
BY ALFRED S. HORWITZ

Frank H. Harmon
ATTORNEY

Jan. 18, 1949.   L. D. CAHILL ET AL   2,459,496
INSTRUMENT CAGING MECHANISM

Filed Dec. 5, 1945   2 Sheets-Sheet 2

INVENTORS
LYSLE D. CAHILL
WALTER T. BUHL
BY ALFRED S. HORWITZ

Frank H. Harmon
ATTORNEY

Patented Jan. 18, 1949

2,459,496

UNITED STATES PATENT OFFICE 2,459,496

INSTRUMENT CAGING MECHANISM

Lysle D. Cahill, South Euclid, and Walter T. Buhl and Alfred S. Horwitz, Shaker Heights, Ohio, assignors, by mesne assignments, to Jack & Heintz Precision Industries, Inc., Cleveland, Ohio, a corporation of Delaware Application December 5, 1945, Serial No. 632,934

5 Claims. (Cl. 74—5)

This invention relates to caging mechanisms for aircraft automatic pilot instruments and has for a primary object to provide an automatic mechanism for caging and uncaging an instrument.

A more particular object is to provide a caging mechanism for an aircraft automatic pilot instrument which automatically uncages the instrument when the automatic pilot is engaged and cages the instrument when the automatic pilot is disengaged.

Another object is to provide a caging mechanism for an aircraft automatic pilot which co-operates with a cardioid cam on a gyro gimbal for moving the gimbal to its caged position and locking it there.

A further object is to provide a caging mechanism for an aircraft automatic pilot which automatically cages the automatic pilot in response to a failure in the automatic pilot hydraulic system.

With the foregoing and other objects in view the invention resides in the following specification and appended claims, certain embodiments and details of construction of which are shown in the accompanying drawings, in which:

Figure 2:
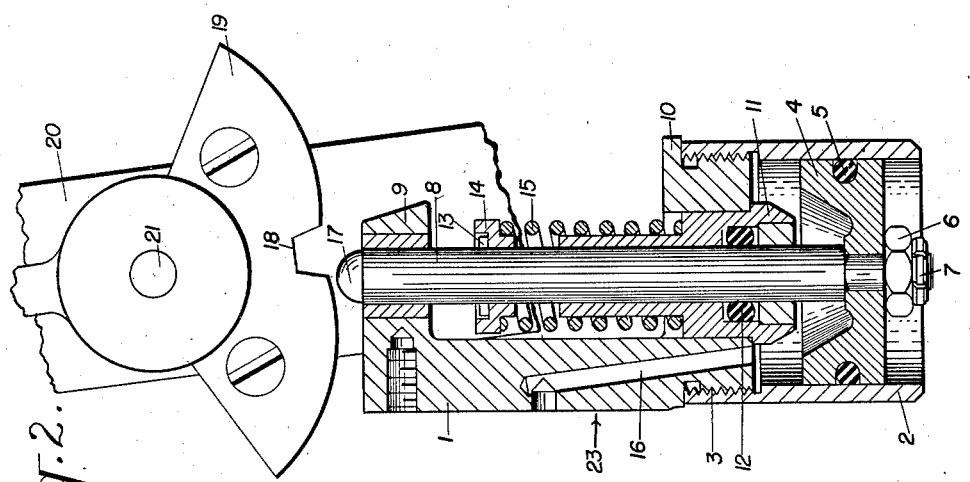
Figure 2 is an enlarged sectional view in elevation of the caging mechanism in the uncaged position.
Figure 3:
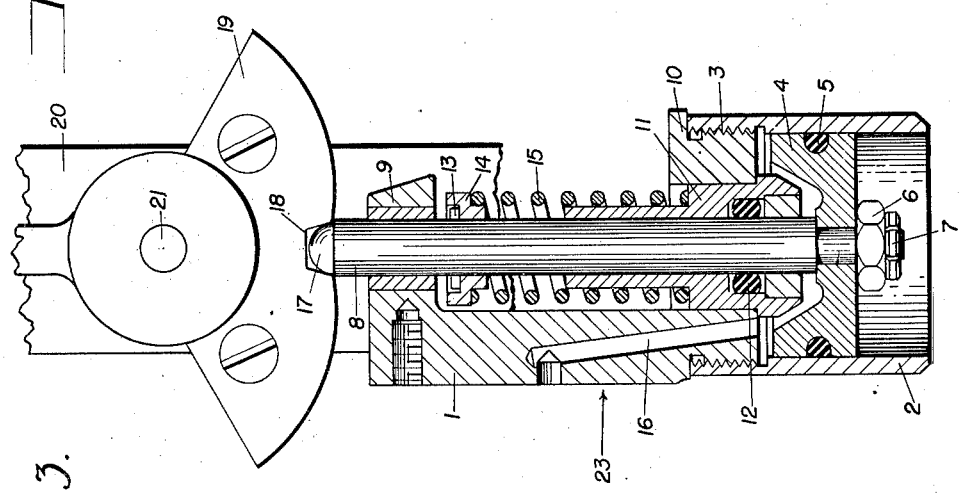
Figure 3 is an enlarged sectional view in elevation of the caging mechanism in the caged or locked position.

Referring more particularly to Figures 2 and 3 a substantially U-shaped mounting frame 1 is shown fixedly supporting a cylinder 2 by means of a threaded section 3. Carried with the cylinder is a piston 4 having a seal 5. Secured to piston 4 by means of two lock nuts 6 and 7 is a piston rod 8, which extends through both legs 9 and 10 of the U-shaped mounting frame 1. A sleeve 11 is provided in leg 10 as a guide for piston rod 8. A seal 12 is inserted between sleeve 11 and piston rod 8 for preventing pressure fluid leaks from within the cylinder 2.

Keyed to the piston rod 8 by a key 13 is a collar 14. A compression spring 15 surrounds the piston rod 8 and engages the collar 14 at one end and the sleeve 11 at the other end. The spring 15 normally holds the piston rod 8 in the position shown in Figure 3 with the piston 4 in its retracted position. A fluid passage 16 leading to cylinder 2 is provided in frame 1. On the end of rod 8 is an engaging ball 17 which, when the rod is extended, engages a detent 18 in a cardioid cam 19 obtaining a locking relationship, as in Figure 3. The cam 19 is shown fixedly attached to a fragmentary portion of a gimbal 20 in a gyro assembly at the pivot 21 of the gimbal.

Figure 1:
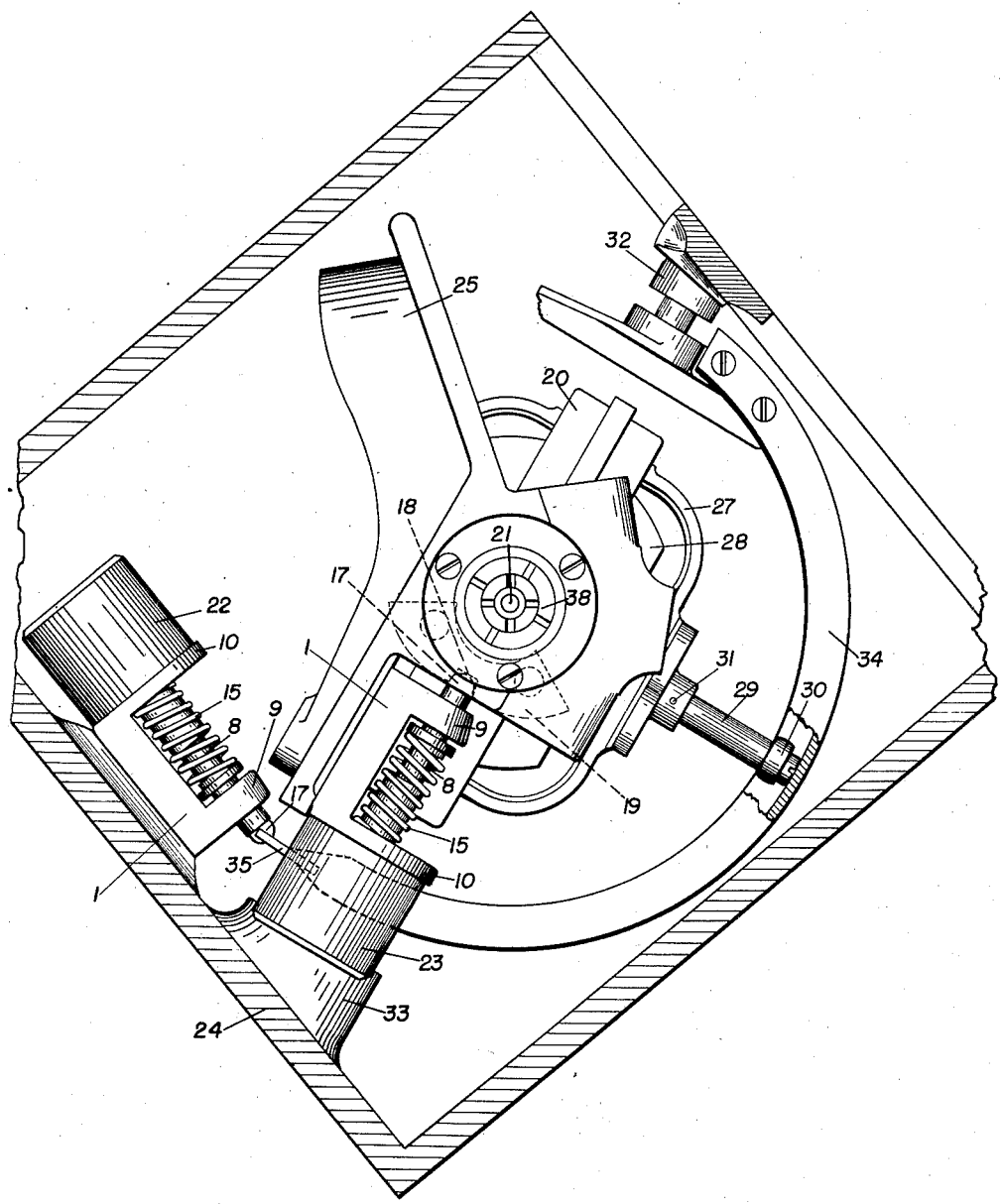
Figure 1 is a partially cutaway view of a tilted automatic pilot instrument employing two of the caging mechanisms.

In Figure 1 two identical caging mechanisms 22 and 23, details of which are similar to the one previously described and shown in Figures 2 and 3, are installed within an hydraulic automatic pilot box 24. A gyro assembly shown in the automatic pilot box 24 consists essentially of an outer frame 25, a gimbal 20 pivoted axially within the frame 25, an inner gimbal 27 pivoted within gimbal 20 with a pivot axis at right angles to the axis of gimbal 20 and a rotor 28 pivoted within the inner gimbal 27 and having its axis at right angles to the gimbal axis. A bail arm 29 having a bearing member 30 is secured to inner gimbal 27 by a pin 31.

An upper bearing housing 32 and a lower bearing housing 33 pivotally support a bail track assembly 34 which is internally slidably engaged by bearing member 30 of the bail arm 29. Fixed to the end of bail track assembly 34, adjacent to the lower bearing housing 33, is a cardioid cam 35 which is shown in dotted lines in the figure. A second cardioid cam 19 is shown in dotted lines mounted on gimbal 20 at its pivot point 21. Also located at pivot point 21 in frame 25 is a pick-off assembly 38 which is not a part of the invention.

Caging mechanism 22 is positioned on the base for engagement and disengagement with cam 35, thereby locking or freeing the inner gimbal 27 through bail arm 29 and bail track 34 during caging and uncaging operations.

Caging mechanism 23 is positioned on the frame 25 for engagement and disengagement with cam 19, thereby locking or freeing the gimbal 20, during caging and uncaging operations.

Operation of the caging mechanism is best understood by referring to Figures 2 and 3. As the automatic pilot is turned "on," fluid pressure is transmitted through fluid passage 16 into cylinder 2. The force exerted by the pressure fluid on piston 4 overcomes the force exerted by spring 15 and the piston rod is moved away from engagement with detent 18 in cam 19. Gimbal 20 is then free to move about pivot 21.

When the automatic pilot is turned "off," no fluid pressure is transmitted to cylinder 2, therefore the force exerted by spring 15 retracts piston 4 and extends piston rod 8 until engaging ball 17 engages cam 19 and eventually detent 18 in cam 19. Detent 18 is located at the point of smallest radius on cam 19. Since the principle of a cardioid cam is that the cam rider, in this case the piston rod 8, is always at the same angle with a tangent at the point of rider contact on the cam, no matter what position the gimbal 20 is in at the time cam 19 is engaged, the cam will cooperate with the force of spring 15 to move the gimbal until ball 17 engages detent 18 in a locking relationship.

Thus it is seen that a positive automatic caging mechanism is provided for use with gyroscopic assemblies, essentially hydraulic automatic pilots, wherein during operation of the assembly or pilot the gimbals are uncaged and upon cessation of operation of the assembly or pilot the gimbals are caged.

We claim:

1. A caging mechanism for use with gyroscopic assemblies having a gimbal frame, comprising a substantially U-shaped mounting frame, a cylinder secured to one side of said U-shaped frame, a piston within said cylinder, a piston rod slidably extending from said piston and from said cylinder through both legs of the U-shaped frame, a sleeve fixedly secured to said U-shaped frame for guiding the piston rod, a collar on the piston rod, positioned between the legs of the U-shaped frame, a spring held under compression between the collar and the sleeve for said piston rod in locked position with said gimbal frame to cage the same, and a passage in the frame for leading pressure fluid into the cylinder to overcome said spring and uncage the gyro.

2. A caging mechanism for use with gyroscopic assemblies having a gimbal frame, comprising a mounting means for said caging mechanism, a cylinder carried by the mounting means, a piston located within said cylinder, a piston rod fixed to said piston and associated with said mounting means, resilient means for holding the piston rod in the extended position to engage said gimbal and cage said gyro and a passage in said mounting means for leading pressure fluid into said cylinder for overcoming the holding action of said resilient means for moving the piston rod to its retracted position out of engagement with said gimbal to uncage the gyro.

3. A caging mechanism for use in gyroscopic assemblies having a gimbal, comprising mounting means for the caging mechanism in the gyroscopic assembly, a cylinder carried by said mounting means, a piston located within said cylinder, a piston rod fixed to said piston and associated with said mounting means, resilient means for normally holding the piston rod in the extended position, means fixed to said gimbal for receiving said extended piston rod and for caging said gimbal, and a passage in said mounting means for leading pressure fluid into said cylinder for overpowering said resilient means and retracting the piston rod from its engagement with the gimbal means leaving the gimbal uncaged.

4. A caging mechanism for use in gyroscopic assemblies with a gimbal, comprising mounting means for the caging mechanism in the gyroscopic assembly, a cylinder carried by said mounting means, a piston located within said cylinder, a piston rod fixed to said piston and associated with said mounting means, resilient means for normally holding the piston rod in the extended position, a cam fixed to said gimbal in alignment with the piston rod, a detent in said cam, means responsive to the resilient extending means of the piston cooperating with the eccentricity of the cam for moving the gimbal until the piston rod engages the detent, and a passage in said mounting means for leading pressure fluid into said cylinder for overpowering said resilient means and retracting the piston rod from its engagement with the detent leaving the gimbal uncaged.

5. A caging mechanism for use in gyroscopic assemblies having a gimbal, comprising mounting means for the caging mechanism in the gyroscopic assembly, a cylinder carried by said mounting means, a piston located within said cylinder, a piston rod fixed to said piston and associated with said mounting means, resilient means for normally holding the piston rod in the extended position, a cardioid cam fixed to said gimbal in alignment with said piston rod, a detent at the point of smallest radius on the cardioid cam for receiving the extended piston rod and thereby locking the gimbal in a caged position, and a passage in said mounting means for leading pressure fluid into said cylinder for overpowering said resilient means and retracting the piston rod from its engagement with the cardioid cam leaving the gimbal uncaged.

LYSLE D. CAHILL.
WALTER T. BUHL.
ALFRED S. HORWITZ.

REFERENCES CITED

The following references are of record in the file of this patent:

UNITED STATES PATENTS

| Number | Name | Date |
|---|---|---|
| 2,207,850 | Brandt | July 16, 1940 |
| 2,207,875 | Roland | July 16, 1940 |
| 2,273,309 | Zand | Feb. 17, 1942 |
| 2,393,124 | Smith | Jan. 15, 1946 |